United States Patent [19]

Chalupa et al.

[11] Patent Number: 5,595,777
[45] Date of Patent: Jan. 21, 1997

[54] PROCESS FOR MAKING GEL-COATED FOODS

[75] Inventors: William F. Chalupa, Aurora, Ill.; George R. Sanderson, Carlsbad, Calif.

[73] Assignee: Monsanto Company, St. Louis, Mo.

[21] Appl. No.: 351,340

[22] PCT Filed: Jun. 11, 1993

[86] PCT No.: PCT/US93/05611

§ 371 Date: May 12, 1995

§ 102(e) Date: May 12, 1995

[87] PCT Pub. No.: WO94/00024

PCT Pub. Date: Jun. 6, 1994

[51] Int. Cl.⁶ .............................. A23L 1/05; A23B 7/16; A21D 15/08; A21D 10/04
[52] U.S. Cl. .............. 426/305; 426/289; 426/293; 426/94; 426/97
[58] Field of Search .................... 426/305, 289, 426/293, 94, 97

[56] References Cited

U.S. PATENT DOCUMENTS

| | | | |
|---|---|---|---|
| 3,078,172 | 2/1963 | Libby | 99/192 |
| 3,676,158 | 7/1972 | Fisher et al. | 99/166 |
| 3,682,654 | 8/1972 | Johnson | 99/103 |
| 3,865,962 | 2/1975 | Earle | 426/291 |
| 4,622,225 | 11/1986 | Tu et al. | 426/27 |
| 5,362,505 | 11/1994 | Hsieh et al. | 426/93 |

*Primary Examiner*—Esther Kepplinger
*Assistant Examiner*—Choon P. Koh
*Attorney, Agent, or Firm*—Jeffrey M. Hoster

[57] ABSTRACT

A process for preparing a gel coated food substrate comprising: a) applying an aqueous batter dispersion having sodium ion sources, calcium ion sources or a combination of sodium ion sources and calcium ion sources, to the surface of a food substrate to form a batter-food substrate complex; b) contacting the batter-food substrate complex with a dry bread material to form a breaded complex; and c) applying an aqueous gel-forming solution to the breaded batter-food substrate complex to form a thermally irreversible gel film around the complex.

12 Claims, No Drawings

PROCESS FOR MAKING GEL-COATED FOODS

BACKGROUND OF THE INVENTION

The invention relates to a process for coating a food substrate with dry bread material and a gel forming substance.

It is well known to form a film around food products such as seafood, meat, poultry, vegetables, cheese and dough products for effective results with respect to shelf life and product integrity. Earle et al., U.S. Pat. No. 3,255,021 and Earle U.S. Pat. No. 3,395,024 exemplify the prior art process of using two solutions to form an alginate film which will hold and bind products together and encapsulate same, thereby retarding oxidation, rancidity, dehydration and moisture migration.

Earle et al., U.S. Pat. No. 4,504,502 describes a food product made by applying an aqueous dispersion containing water soluble algin to the surface of a food substrate, and applying a dry gelling mixture to the algin-coated food substrate for a period of time sufficient to form a substantially continuous edible film along the surface of the food product.

SUMMARY OF THE INVENTION

The invention is a process for preparing a gel coated food substrate comprising:

a) applying an aqueous batter dispersion having sodium ion sources, calcium ion sources or a combination of sodium ion sources and calcium ion sources, to the surface of a food substrate to form a batter-food substrate complex;

b) contacting the batter-food substrate complex with a dry bread material to form a breaded complex; and c) applying an aqueous gel-forming solution to the breaded batter-food substrate complex to form a thermally irreversible gel film around the complex.

Preferably, the process includes the application of flour to the food substrate prior to step a).

The gel-forming solution comprises one or more gel-forming polysaccharides which form gels in the presence of sodium ions, calcium ions, or a combination of sodium ions and calcium ions. The aqueous gel-forming solution is preferably applied by spraying means. More preferably, the gel-forming polysaccharide is water soluble algin or gellan gum. The preference for water soluble algin or gellan gum depends on the conditions at which gel formation is desired.

If gel formation is desired at elevated temperatures, e.g. above room temperature, gellan gum is preferred. Because sodium ions and calcium are both effective for forming gellan gum gels, either sodium ion sources or calcium ion sources, or both, are suitable for batter preparation.

If gel formation is desired at room temperature or below, water soluble algin is preferred. Because polyvalent cations, e.g. calcium ions, are required for forming water soluble algin gels, calcium ion sources are preferred for batter preparation.

DETAILED DESCRIPTION OF THE INVENTION

According to the present invention, battered and breaded foods can be prepared which have a fatty taste and which are not fried. The foods are coated, e.g. by spraying, brushing, or dipping means, with a gel-forming solution according to the procedure outlined below, and optionally heated, e.g. baked in a conventional oven. Typically, the procedure of the invention is used to prepare chicken pieces, onion rings, cheese sticks, onion snacks, and potato chips.

Food products prepared according to the procedure of the present invention have the following general composition:

| | |
| --- | --- |
| food substrate | 32–78% |
| batter | 10–30% |
| bread material | 4–16% |
| gel film | 8–22% |

Preferably, the food substrate is predusted with all purpose flour in an amount of up to 2% of the final prepared food product.

More preferred food products comprise 44–64% food substrate, about 1% all purpose flour (dusting), 15–25% batter, 8–13% bread material, and 12–17% gel film. Even more preferred food products comprise about 54% food substrate, about 1% all purpose flour (dusting), about 20% batter, about 10% bread material, and about 15% gel film.

Food substrates

Food substrates include, for example, seafood, meat, poultry, vegetable, e.g. onions, potatoes, green peppers, zucchini, and squash, fruits, combinations or dough products. The dough products may include pizza, burritos, tortillas, egg rolls, pie crust and the like. Preferably, the food substrate is poultry.

Aqueous batter dispersions

Aqueous batter dispersions useful in the present invention have calcium and/or sodium ion sources and typical batter ingredients e.g. water, all purpose flour, corn meal, milk or milk solids, and egg whites. However, these, batters differ from typical batters in that they have low levels of all purpose flour, to minimize pastiness. The batters contain xanthan gum, preferably fine mesh xanthan gum such as KELTROL® F (200 mesh), in order to enhance batter viscosity.

Preferably, the calcium ion source is calcium gluconate, calcium lactate or calcium chloride, more preferably calcium gluconate. The sodium ion source is preferably sodium chloride, but may also be sodium alginate. Milk or milk solids are preferably non-fat. Egg whites are preferably dried powder egg whites. If starches are used in the batter formulation, high temperature gelling starches, e.g. corn starch (which gels above @62 degrees C) are preferred. Flavorings such as onion powder, garlic powder, paprika, black pepper, ground rosemary, ground thyme, white pepper, sage, yeast extract, smoke, barbecue and cheese flavors may be used as well as other flavorings and colorings.

Preferred batter dispersion weight percentages are shown below:

| | |
| --- | --- |
| water | 62–84.4% |
| corn meal, yellow | 10–21% |
| all purpose flour | 3–9% |
| calcium ion source | 0.5–1.5% |
| sodium ion source | 1.0–3.5% |
| milk solids | 0.5–1.1% |
| corn starch | 0.2–0.65% |
| egg white (dried) | 0.3–0.9% |
| xanthan gum | 0.1–0.35% |

Sugar may also be added to the batter in an amount of up to 9.0%.

Dry bread material

Dry bread material includes leavened bread crumbs, wheat crumbs, corn crumbs, and Japanese-Style bread crumbs. Japanese Style bread crumbs, having #8 mesh particle size, are preferred.

Aqueous gel-forming solutions

Aqueous gel-forming solutions used to form the gel coating are prepared using conventional procedures for making gellan gum and sodium alginate solutions. The solutions comprise water and a gel-forming polysaccharide, and optional additional texturing agents, e.g. sugar, corn syrups, as well as flavorings, such as onion powder, garlic powder, paprika, black pepper, ground rosemary, ground thyme, white pepper, sage, yeast extract, smoke, barbecue and cheese flavors, and colorings, such as caramel coloring.

The gel-forming solution of the present invention is comprised of:

| water | 98.5–99.9% |
|---|---|
| gel-forming polysaccharide | 0.1–1.5% |

Gel-forming solutions including optional additional ingredients are formulated by partially replacing water. The preferred gel-forming solution includes water, gellan gum or sodium alginate or combinations thereof, and flavoring and colorings comprising:

| water | 97.5–99.8% |
|---|---|
| gellan gum or sodium alginate or combinations thereof | 0.1–1.5% |
| flavorings and/or colorings | 0.1–1.0% |

Various alginates useful in this invention are described in detail by I. W. Cottrell and P. Kovacs in "Alginates", Chapter 2 of Davidson, ed., Handbook of Water-Soluble Gums and Resins (1980). Most preferred herein are naturally derived algal sodium alginates (also called "algin" or "alginic acid sodium salt"), such as those sold commercially under the trademarks KELTEX®, KELGIN® and KELTONE™ by Kelco Division of Merck & Co., Inc.

Alginates also include "bioalgin", microbially produced polysaccharides produced by both Pseudomonas and Azotobacter strains as described, for example, in Jarman et al., U.S. Pat. No. 4,235,966. These alginates are polysaccharides consisting of a partially acetylated variable block copolymer of D-mannuronic and L-guluronic acid residues. Jarman et al. state that the polysaccharide produced is similar to that produced from seaweed except that the molecule is partially acetylated.

Xanthan gum is an extracellularly produced gum made by the heteropolysaccharide-producing bacterium *Xanthomonas campestris* by whole culture fermentation of medium comprising a fermentable carbohydrate, a nitrogen source and other appropriate nutrients. Examples of commercially available xanthan gum are KELTROL® T, KELTROL® F, KELZAN® AR and KELZAN®, available from Kelco Division of Merck & Co., Inc. Processes for producing xanthan gum are described in a number of patents including U.S. Pat. Nos. 4,316,012, 4,352,882 and 4,375,512.

Gellan gum is a heteropolysaccharide prepared by fermentation of *Pseudomonas elodea* ATCC 31461. An example of commercially available gellan gum is KELCOGEL®, available from Kelco Division of Merck & Co., Inc. Processes for preparing gellan gum include those described in U.S. Pat. Nos. 4,326,052 and 4,326,053.

In a preferred embodiment of the present invention, a food substrate is prepared for cooking according to the procedure outlined above and either frozen raw and stored or cooked in a convection or conventional oven. If the prepared food substrate is frozen raw, it can later be cooked in a convection or conventional oven. Alternatively, the prepared food substrate is cooked in a convection or conventional oven, frozen, and later reheated in a microwave oven.

The cooked finished product has the appearance and taste of a fried product, without the fat content normally associated with fried foods.

The process of the present invention may be effected using standard batter and breading machines and other existing equipment to achieve the desired results of the process.

EXAMPLES

Example 1

The following ingredient amounts and procedures were used to coat and cook chicken.

| INGREDIENTS | QUANTITY | |
|---|---|---|
| PART A: DUSTING | | |
| Flour, all purpose | 300 grams | |
| | GRAMS | PERCENT |
| PART B: BATTER | | |
| Water | 500.000 | 72.979 |
| Corn meal, yellow | 100.000 | 14.596 |
| Flour, all purpose | 40.000 | 5.838 |
| Salt | 17.000 | 2.481 |
| Calcium gluconate | 7.500 | 1.095 |
| Milk solids, non-fat | 5.000 | 0.730 |
| Egg white, dried | 4.000 | 0.584 |
| Corn starch | 3.000 | 0.438 |
| KELTROL® F | 1.500 | 0.219 |
| Onion powder | 0.500 | 0.073 |
| Garlic powder | 0.150 | 0.022 |
| Paprika | 0.500 | 0.073 |
| Black pepper, 25 mesh | 0.600 | 0.088 |
| Ground rosemary | 0.060 | 0.009 |
| Ground thyme | 0.040 | 0.006 |
| White pepper | 0.200 | 0.030 |
| Sage | 0.060 | 0.009 |
| Yeast extract | 5.000 | 0.730 |
| TOTALS | 685.110 | 100% |
| PART C: BREADING | | |
| Japanese style bread crumbs (#8 mesh) | 300 grams | |
| | GRAMS | PERCENT |
| PART D: GEL-FORMING SOLUTION | | |
| Water | 479.000 | 98.590 |
| KELTONE® HV | 4.000 | 0.823 |
| Caramel color (RT #175, Sethness) | 2.850 | 0.587 |

Various ingredients are available from Griffith Labs USA, 12200 S. Central Ave., 1 Griffith Center, Alsip, Ill. 60658; Sethness, 2367 W. Logan Blvd., Chicago, Ill. 60647; A.E., Staley Mfg. Co., Industrial Products Group, 3300 East Elderado St., Decator, Ill. 62525.

Procedure
Blending:
1. Blend all dry batter ingredients.
2. Place cold water in a mixing bowl.
3. Add dry blend to water while stirring briskly with a wire whip for 3 minutes.
4. Weigh gel-forming solution water in 1 liter beaker.
5. Dry blend caramel color and KELTONE® HV. Disperse in 3–5 times its weight propylene glycol. Add dispersion to beaker and mix using a high speed mechanical mixer.
6. After mixing, pour gel-forming solution into spray bottle and adjust so a fine mist is formed when pumping.

Coating:
1. Predust chicken with a very fine coating of flour, shaking off excess flour.
2. Dip into batter mix.
3. Coat with Japanese style bread crumbs.
4. Spray with KELTONE® HV solution to form an even coating on both sides of the chicken.
5. a) Place pieces of coated chicken on rack in freezer.
   b) Cook pieces of coated chicken in an oven and freeze.

Reconstitution:
1. If chicken was frozen raw, heat the coated chicken in oven 15–20 minutes @190 degrees C., or until done.
2. If chicken was cooked, then frozen, reheat in oven 5–7 minutes @190 degrees C., or microwave on high 1.5–2 minutes.

Examples 2, 3, and 4

Using the same batter, breading and gel-forming solution described in Example 1, fish, vegetables and cheese food substrates were prepared according to the same procedures used to prepared chicken.

Example 5

The following ingredient amounts and procedures were used to coat and cook dehydrated onions.

| INGREDIENTS | QUANTITY | |
|---|---|---|
| | GRAMS | PERCENT |
| PART A: BATTER | | |
| Water | 500.000 | 70.423 |
| Corn meal, yellow | 100.000 | 14.085 |
| Flour, all purpose | 40.000 | 5.634 |
| Salt | 12.000 | 1.690 |
| Calcium gluconate | 7.500 | 1.056 |
| Milk solids, non-fat | 5.000 | 0.704 |
| Egg white, dried | 4.000 | 0.563 |
| Corn starch | 3.000 | 0.423 |
| KELTROL® F | 1.500 | 0.211 |
| Onion powder | 4.000 | 0.563 |
| Sugar | 33.000 | 4.648 |
| TOTALS | 685.110 | 100% |
| PART B: BREADING | | |
| Japanese style bread crumbs (#20 mesh) | 300 grams | |
| PART C: GEL-FORMING SOLUTION | | |
| Water | 479.000 | 98.590 |
| KELTONE® HV | 4.000 | 0.823 |
| Caramel color (RT #175, Sethness) | 2.850 | 0.587 |

Various ingredients are available from Griffith Labs USA, 12200 S. Central Ave., 1 Griffith Center, Alsip, Ill. 60658; Sethness, 2367 W. Logan Blvd., Chicago, Ill. 60647; A. E., Staley Mfg. Co., Industrial Products Group, 3300 East Elderado St., Decator, Ill. 62525.

Procedure
Blending:
1. Blend all dry batter ingredients.
2. Place cold water in a mixing bowl.
3. Add dry blend to water while stirring briskly with a wire whip for 3 minutes.
4. Weigh gel-forming solution water in 1 liter beaker.
5. Dry blend caramel color and KELTONE® HV. Disperse in 3–5 times its weight propylene glycol. Add dispersion to beaker and mix using a high speed mechanical mixer.
6. After mixing, pour gel-forming solution into spray bottle and adjust so a fine mist is formed when pumping.

Coating:
1. Dip dehydrated onions into batter mix.
2. Coat with Japanese style bread crumbs.
3. Spray with KELTONE® HV solution to form an even coating on both sides of the chicken.
4. Place coated onions on cookie sheet and dry in convection oven @121 degrees C. for about 15 minutes to targeted moisture level.

Since many embodiments of this invention may be made and since many changes may be made in the embodiments described above, the foregoing is to be interpreted as illustrative, and the invention defined by the following claims.

What is claimed is:

1. A process for preparing a gel coated food substrate comprising:
   a) applying an aqueous batter dispersion having sodium ion sources, calcium ion sources or a combination of sodium ion sources and calcium ion sources, to the surface of a food substrate to form a batter-food substrate complex;
   b) contacting the batter-food substrate complex with a dry bread material to form a breaded complex;
   c) applying an aqueous gel-forming solution to the breaded batter-food substrate complex to form a thermally irreversible gel film around the complex.

2. A process of claim 1 which comprises applying flour to the food substrate prior to step a).

3. A process of claim 1 wherein the calcium ion source is selected from the group consisting of calcium gluconate, calcium lactate or calcium chloride.

4. A process of claim 3 wherein the calcium ion source is calcium gluconate.

5. A process of claim 1 wherein the sodium ion source is sodium chloride.

6. A process of claim 1 wherein the dry bread material consists of leavened bread crumbs.

7. A process of claim 1 wherein the aqueous gel-forming solution consists of water and a gel-forming polysaccharide.

8. A process of claim 7 wherein the gel-forming polysaccharide forms gels in the presence of sodium ions.

9. A process of claim 7 wherein the gel-forming polysaccharide forms gels in the presence of calcium ions.

10. A process of claim 7 wherein the aqueous gel-forming solution consists of water and a gel forming polysaccharide selected from the group consisting of water soluble algin and gellan gum.

11. A process of claim 10 wherein the polysaccharide is water soluble algin.

12. A process of claim 10 wherein the polysaccharide is gellan gum.

* * * * *